United States Patent [19]
Todd et al.

[11] 3,914,922
[45] Oct. 28, 1975

[54] METHOD AND APPARATUS FOR CONTROLLING THE MOVEMENT OF CROP MATERIAL IN A ROLL FORMING MACHINE

[75] Inventors: Robert R. Todd, Leola; Willis R. Campbell, Ephrata, both of Pa.

[73] Assignee: Sperry Rand Corporation, New Holland, Pa.

[22] Filed: Apr. 18, 1974

[21] Appl. No.: 462,005

Related U.S. Application Data
[63] Continuation-in-part of Ser. No. 405,978, Oct. 12, 1973, Pat. No. 3,866,531.

[52] U.S. Cl. .................................. 56/1; 56/DIG. 2
[51] Int. Cl.² ...................................... A01D 39/00
[58] Field of Search .................................. 56/341, 1

[56] References Cited
UNITED STATES PATENTS
3,847,073  11/1974  Mast et al. .................. 56/341 X

*Primary Examiner*—Russell R. Kinsey
*Attorney, Agent, or Firm*—John R. Flanagan; Frank A. Seemar; Joseph A. Brown

[57] ABSTRACT

A method and apparatus for controlling the movement of crop material in a roll forming machine utilizes a direction means mounted to the rear portion of the floor of a material rolling machine. The direction means operates to compress the material as well as directing the material during the roll forming operation. The direction means further provides a method by which a semi-continuous mode of operation can be obtained.

2 Claims, 6 Drawing Figures

METHOD AND APPARATUS FOR CONTROLLING THE MOVEMENT OF CROP MATERIAL IN A ROLL FORMING MACHINE

This application is a continuation-in-part of Ser. No. 405,978, filed Oct. 12, 1973 and now U.S. Pat. No. 3,866,531.

BACKGROUND OF THE INVENTION

This invention is directed to crop material roll forming machines and more particularly to a method and apparatus to direct material on the machine during the roll forming operation.

For many years, it has been customary to harvest forage crops by mowing the crops, letting them dry in the field, forming the dried crop into windrows, gathering the crops in windrowed form and forming the gathered crop material into rectangular bales.

Recently, it has been found that by forming the crop material into large compact rolls of material rather than rectangular bales, as previously done, the material in roll form could be deposited and left in the field because the roll of material tends to provide a self-shedding protective covering from inclement weather. Since the rolled bale can be left in the field the additional steps of gathering the rectangular bales and transporting the gathered bales to a storage area away from the elements can be eliminated.

Several methods of forming compact rolls of material have been devised throughout the years. In one of these methods a machine rolls the swath or windrow of material along the ground until a roll of desired size is obtained. Another, and more successful, method comprises a machine in which a swath or windrow of material is picked up from the field and directed onto a lower conveyor. This conveyor transports material in one direction while an upper apron, usually positioned above and adjacent the conveyor moves in an opposite direction thereby rotating crop material, with which it contacts, in a circular motion. This operation is continued until a roll of desired size and density has been formed at which time additional crop material ceases to be delivered to the lower conveyor. To discharge the formed roll the upper apron is raised from the roll thereby permitting the roll to be moved from the floor by the lower conveyor.

This type of crop material roll forming machine has encountered certain difficulties. For example, the operation described above necessitates the disruption of the bale forming process when the bale is discharged thereby lengthening the time necessary for a farmer to harvest his crops by 25 to 30 per cent.

Secondly, it has been difficult at times to obtain a roll of crop material with a desired density.

Thirdly, the crop material during the hay rolling operation exerts a variety of forces upon the upper apron and in many instances has caused fractures on various portions of the upper apron.

Finally, the design of this latter type crop material roll forming machine makes it necessary for the crop material transported by the supporting conveyor to be properly positioned with respect to the upper apron assembly to successfully initiate the core of the roll.

OBJECTS AND SUMMARY OF THE PRESENT INVENTION

The principle object of the present invention is to provide an improved roll bale machine having novel means for directing material being transported by a lower conveyor into contact with an upper apron assembly.

Another object of the present invention is to provide an improved roll bale machine adapted to compress crop material prior to its contact with an upper apron assembly, to enhance density characteristics of the roll being formed.

Another object of the present invention is to provide an improved roll bale machine having means to direct material being transported by a conveyor into contact with an upper apron assembly and which means will effectively eliminate excessive forces heretofor applied to the upper apron.

A further object of the present invention is to provide a method for forming an improved roll bale of crop material which will permit the initial formation of the roll of material prior to the lowering of the upper apron after the bale discharging operation has been completed, thereby enabling the roll forming machine to operate in a semi-continuous manner during the baling operation.

The present invention contemplates improved method and apparatus for controlling the movement of crop material in a roll forming machine having a frame adapted to travel across a field and a floor mounted to the frame for receiving a swath of crop material. Conveying means are associated with the floor which cooperate with an upper apron assembly mounted for movement above the conveyor and in an opposite direction thereto for effectively rotating the crop material to form a roll. More specifically, direction means are operably associated with the rear portion of the floor for controllably guiding a swath or windrow of material on the conveyor into contact with the upper apron thereby enhancing roll density characteristics while preventing the application of excessive forces to the upper apron and which further facilitate a semi-continuous mode of operation for the machine.

Other objects and advantages of the present invention will become apparent and obvious from a study of the following description and the accompanying drawings which are merely illustrative of the present invention.

DETAILED DESCRIPTION OF THE PREFERRED EMBODIMENT

Figure 1:
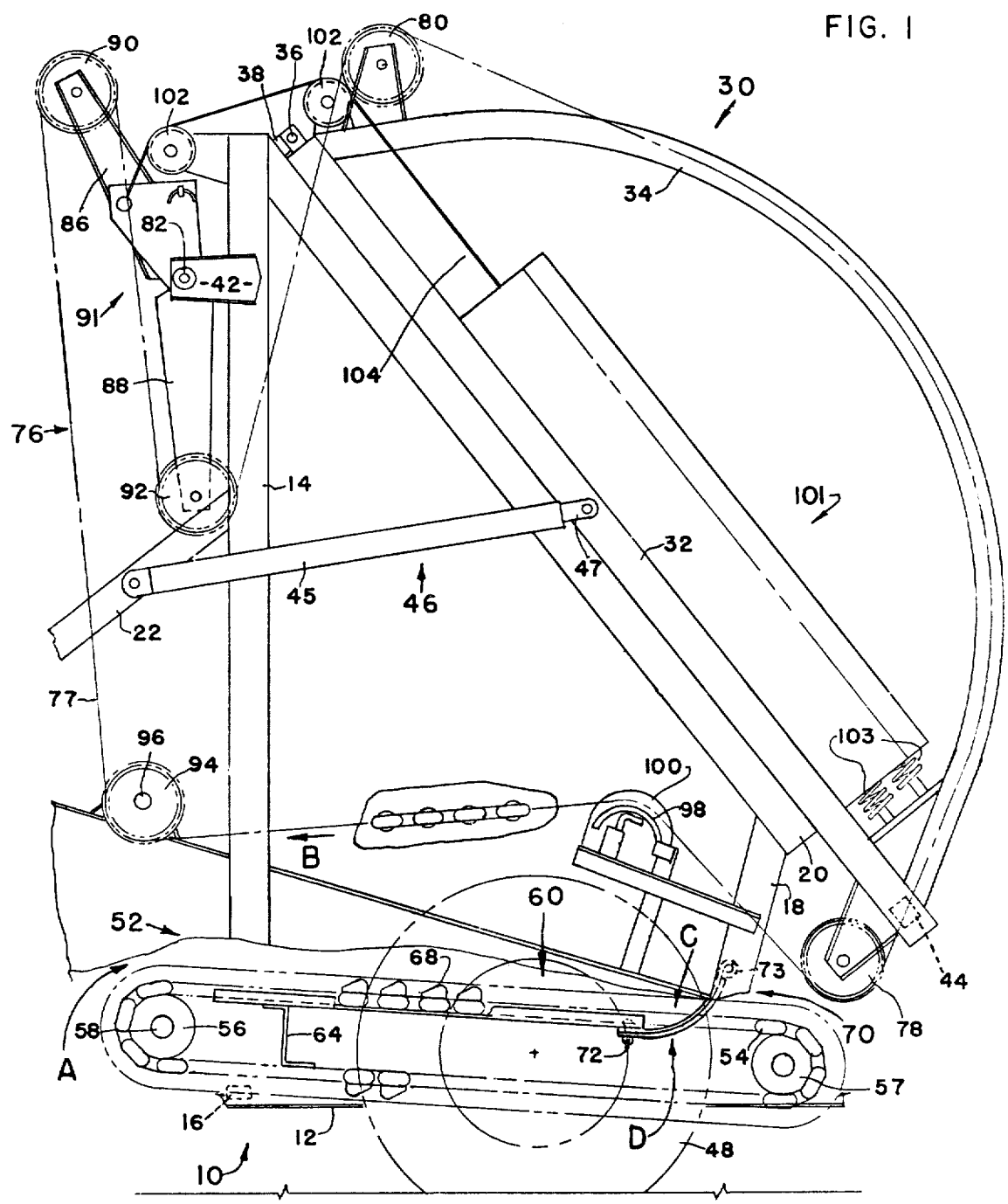
FIG. 1 is a side elevation of a crop material roll forming machine in its initial or core forming position.
Figure 2:
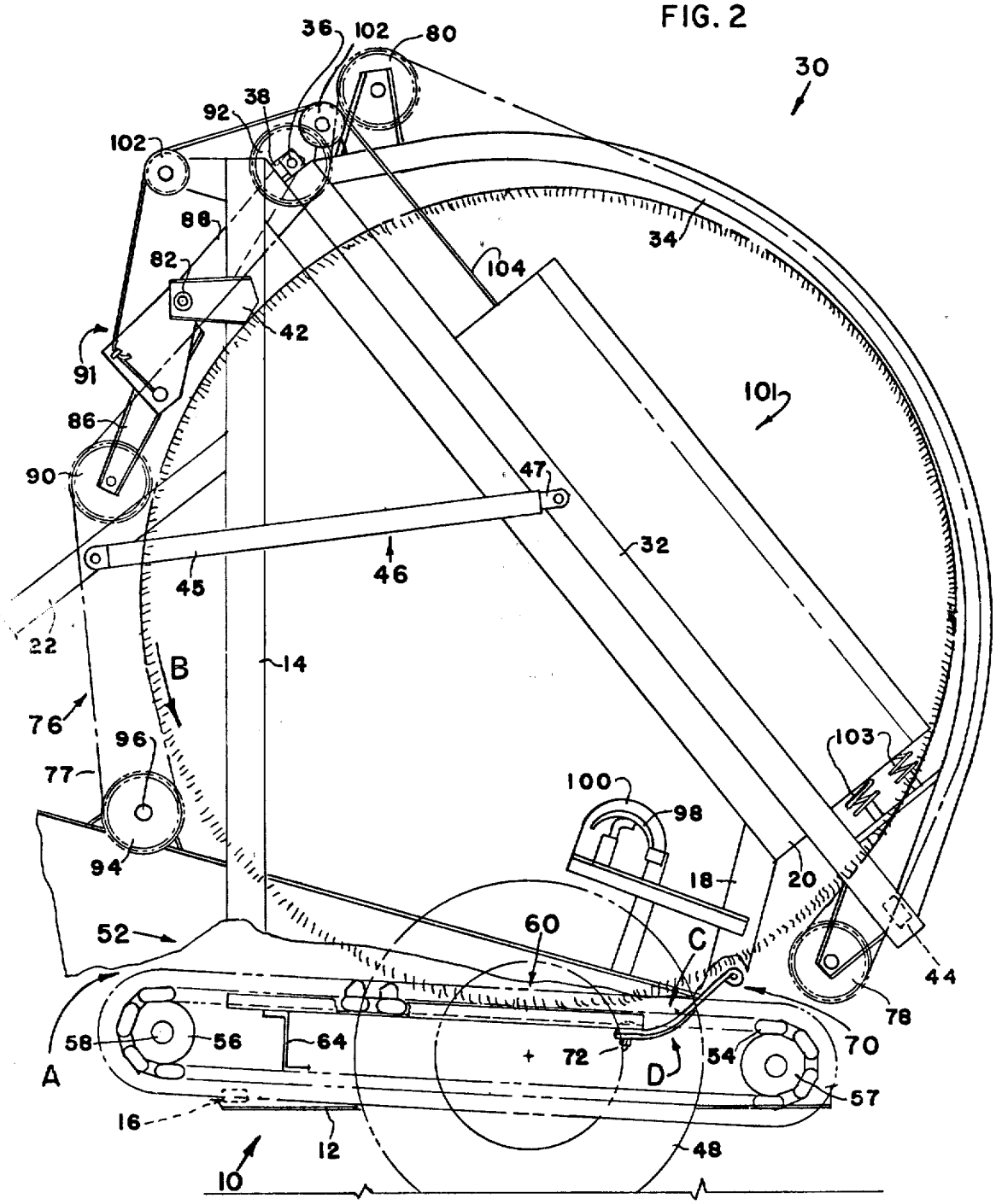
FIG. 2 is a side elevation of a crop material roll forming machine containing a round bale.
Figure 3:
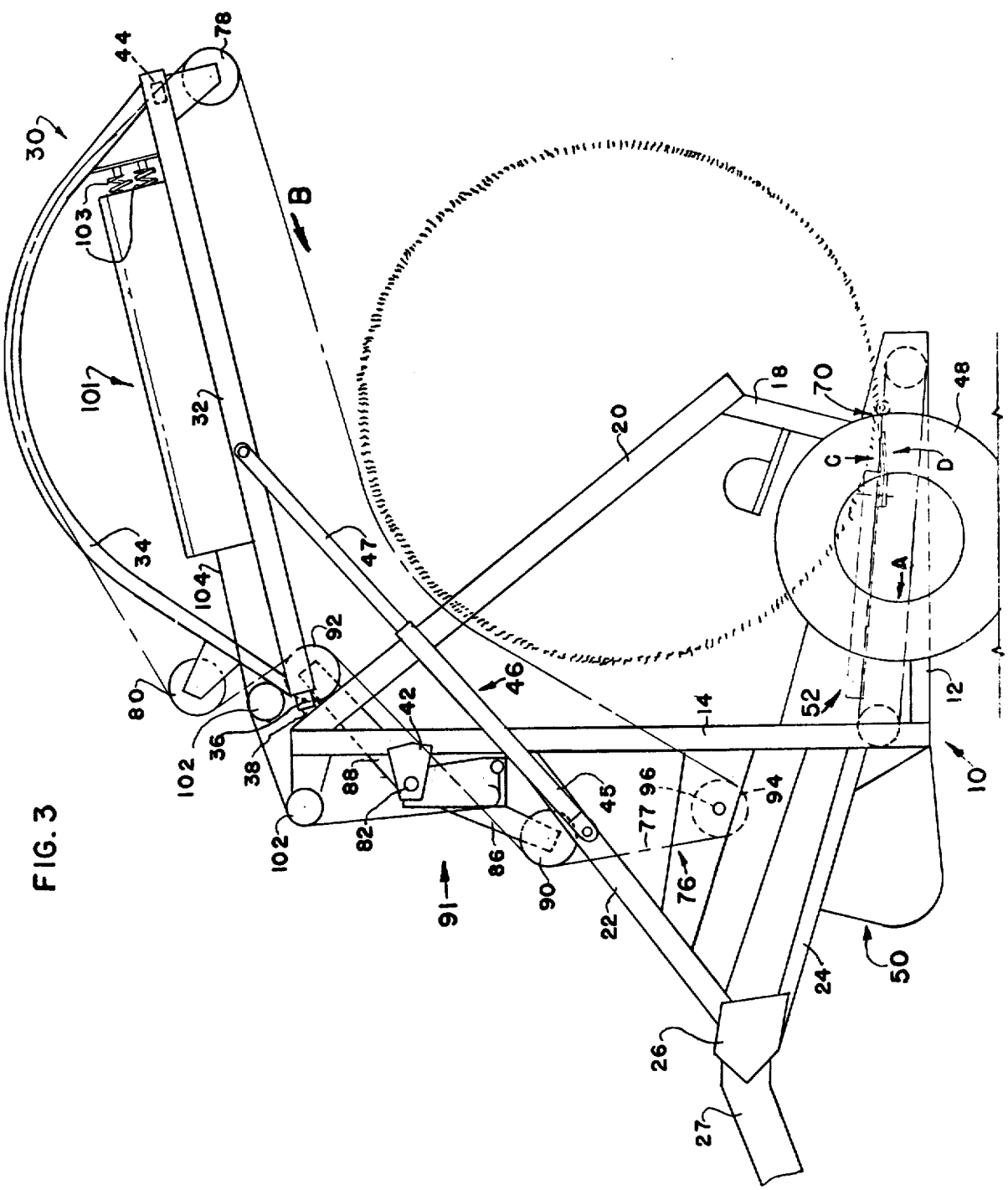
FIG. 3 is a side elevation of a crop material roll forming machine in its discharge position.
Figure 4:
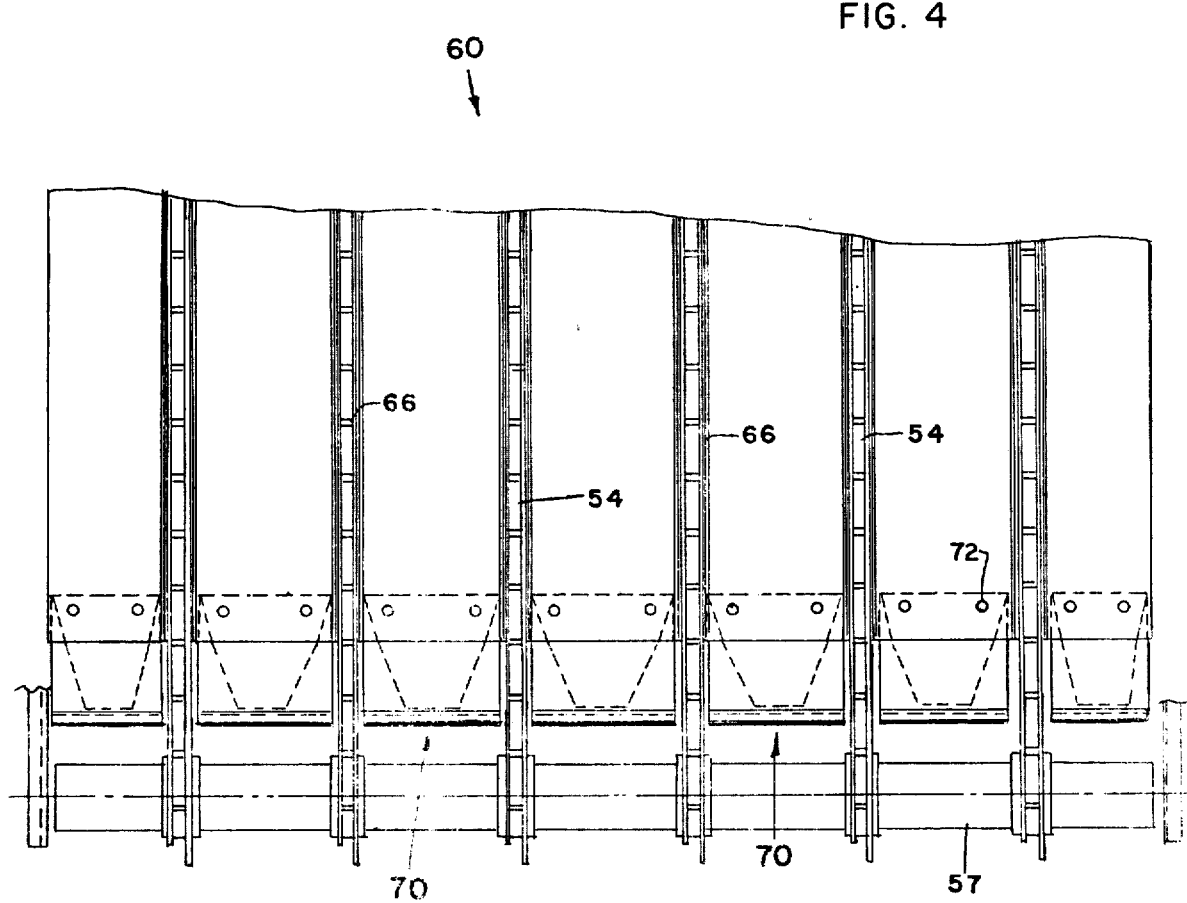
FIG. 4 is a plan view of a floor section of the crop material roll forming machine.
Figure 5:
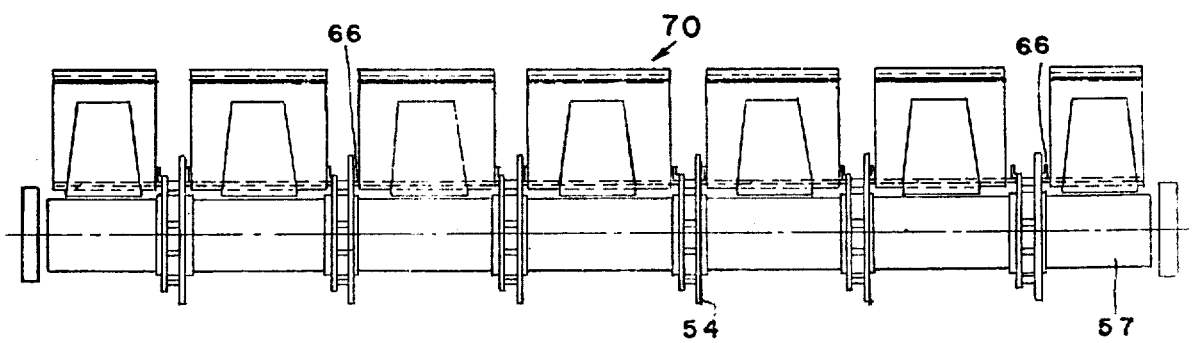
FIG. 5 is an end view of the floor section of the crop material roll forming machine.

Referring to FIGS. 1 – 3, the machine illustrated therein comprises a base frame 10 having sides fixedly connected together, such as by welding or the like. Each side of said frame comprises a bottom horizontal member 12. The forward end thereof is connected to a vertical member 14. Extending perpendicularly to the junction of members 12 and 14 is cross member 16, an end of which is fixedly connected to the junction of members 12 and 14. A short frame member 18 extends upwardly from the rearward portion of bottom member 12 and the upper end thereof is connected to one end of an upwardly and forwardly extending angular brace member 20, which is connected at its upper end to the upper end of vertical member 14. Extending forwardly from member 14 at each side of the machine is an A-frame (shown in FIG. 3) consisting of angularly related members 22 and 24, the rearward ends of which are fixed to the front face of vertical member 14 and the forward ends being connected together at plate 26. Tractor hitch 27 is mounted to plate 26 and extends forwardly from the plate.

An upper frame 30 is provided with side frames composed of straight frame members 32, the ends of which are connected to the opposite ends of an arcuate frame member 34. The upper most portion of each side frame member is pivotally connected at 36 to a suitable bearing fixed to the upper end of vertical frame member 14. Frame member 38 extends between the upper end of angular brace member 20 of frame 10 thereby stabilizing the connection of the upper frame 30 at pivotal connection 36. The upper end of base frame 10 is stabilized transversely by a bracing member (not shown) which extends between bearing brackets 42 which are connected to the front faces of the vertical frame members 14.

The lower rearward end of upper frame 30 also has a cross frame member 44 extending between the opposite sides of the frame composed of members 32 and 34.

Upper frame 30 is moved from its lower, bale forming position as shown in FIGS. 1 and 2 to its extended bale discharge position, shown in FIG. 3, by a pair of hydraulic cylinders 46. These hydraulic cylinders have their barrel ends 45 connected to member 22 and their rod end 47 connected to member 32 of upper frame 30. Suitable hydraulic lines, not shown, are connected to opposite ends of cylinder 46 to simultaneously activate and control the operation of the upper frame.

The base frame 10 has a pair of wheels 48 (one wheel of each pair being shown) connected thereto at opposite sides of the frame by an axle, not shown in order that the hay roll forming machine may be drawn by a tractor or other suitable implement over a field for purposes of forming a roll of hay or similar forage material.

Extending forwardly from the front end of base frame 10 is a pickup header 50. This header is adapted to engage, elevate and rearwardly feed a swath or windrow of forage material onto the crop material roll forming machine. The material engaged by the header is passed rearwardly from the entrance end of lower apron 52 towards the rear of the machine. The lower apron 52 comprises a conveying means having a series of endless, flexible chains 54 which are transversely spaced apart even distances and which extend around driven sprockets 56 rotatably mounted on shaft 58 at the forward end of the hay rolling machine. The chains 54 also pass around idler sprockets 57 rotatably mounted at the rear of the machine. Mounted above the horizontal member of frame 10 is a floor 60. The floor is rigid and connected to frame 10 by a series of extending bars 64, the opposite ends of which are suitably connected to horizontal member 12 of base frame 10 to support the floor in a horizontal position. The upper courses of the chains 54 slide in channels 66 on floor 60. These channels are transversely spaced and suitably secured to floor 60 to support and guide the chains across the floor of the machine. The links of chains 54 have lugs 68 connected thereto. The upper courses of the chains 54 move in direction A shown in FIGS. 1 – 3, so that the leading edges of the lugs engage and direct the material rearwardly across the floor portion of the machine.

The rear most end of floor 60 contains a series of springs 70. These springs are plates which are heat treated and which have an arcuate shape to extend up and away from the floor of the machine, as shown in FIG. 1. These springs comprise a series of plates placed behind each other so as to form a leaf spring arrangement. They are mounted between the channels 66 which contain chains 54 thereby acting as a continuation of the floor of the machine. The forward most end of each spring is connected to the floor by bolts 72. The outer or rear most end 73 of each spring curves rearwardly and downwardly so as not to interfere with the roll forming or discharging operation of the roll forming machine. The spacing of the springs from one another is sufficiently wide to permit the chains 54 and lugs 68 to project therethrough when the springs are in a horizontal position. When the springs are in their elevated or initial core forming position, shown in FIG. 1, the chains and lugs disappear below springs 70 at position D. This movement of the lugs below the springs results in the lugs disengaging the roll of material as it is being formed, thereby enabling the upper apron to engage and direct the material during the roll forming operation.

The upper frame 30 and certain guide rolls and sprockets which augment and support the upper apron 76 are shown in FIGS. 1 – 3. The upper apron preferably comprises a pair of endless flexible link type chains 77 having, at longitudinally spaced intervals, bars (not shown) which extend between said chains the full width of the machine. The bars may be square or of any other suitable geometric shape. The upper apron 76 is supported and driven by various rollers and sprockets. At each side of upper frame 30, guide sprockets 78 and 80, respectively, are supported by clevises which are connected to the opposite ends of the arcuate member 34. Affixed to the end of shaft 82, which is supported in bearing brackets 42 adjacent the upper end of vertical frame member 14, are pairs of oppositely extending arms 86 and 88. These arms comprise the expansion means 91 for the upper apron. The ends of said arms support rotatable guide sprockets 90 and 92 upon which the endless chains of upper apron 76 extends in the manner shown in FIGS. 1 – 3. Connected to the expansion means is a spring and cable assembly 101. This assembly contains a cable 104 which passes over pulley 102. The cable has one end connected to the expansion means and another end connected to spring 103. The spring is mounted to frame 10 so as to exert pressure on the cable to retard the rotational movement of the expansion means. This assembly operates to maintain the upper apron in contact with the roll of material as it is being formed so a particular density of material can be obtained. Driving sprockets 94 are provided at each side of the main frame and are connected to a driven shaft 96 that is supported in appropriate bearings fixed relative to the main frame 10. The lower course of the upper apron 76 also slidably extends over the upper curved surface of movably mounted auxiliary guide members 98. These auxiliary guide members 98 are spring loaded and are adapted to be retracted into accommodating spaces in the side plates of the machine so as not to interfere with the ends of the roll of material as the roll is being formed. Therefore, as the roll increases in diameter the auxiliary guide plates 98 will be pushed through openings 100 so as not to interfere with the ends of the roll as the roll increases in diameter.

OPERATION

As the hay roll forming machine is drawn over a field its pickup header 50 retrieves a swath of windrow material from the field and elevates and transports said material onto the floor 60 of the hay rolling machine. This material is placed on the floor whereupon the lugs, mounted on the flexible chain 54 rotating in direction A, transport the material from the front portion of the floor towards the rear. As the material moves towards the rear of the machine, it is directed up and away from the floor by springs 70. These springs, due to their arcuate shape, strip the material from the lugs thereby causing the material to move upwardly along the springs compressing the material at position C of the springs. As material is continuously being delivered to the floor of the machine the material at position C is directed against upper apron 76 (as shown in FIG. 1 in its bale forming position) which is rotating in direction B, opposite to the direction of rotation of lower chain 54. This type of rotation causes the material to be rotated in a counterclockwise manner to form the material into a roll.

This procedure is continued thereby progressively increasing the diameter of the roll of material. As the roll expands in diameter, the springs 70 (due to the increased weight of the bale) will be deflected downwardly causing the springs to conform with the outer periphery of the bale. Such a deflection, by springs 70, is shown in FIG. 2.

When the roll is formed and it is desired to discharge the formed roll of material additional crop material ceases to be delivered to floor 60. Upper frame 30 is then elevated to its bale discharge position through the use of hydraulic cylinders 46 while the lugs mounted on the lower chain 54 engage the bottom most portion of the roll of material thereby moving said material rearwardly further compressing springs 70 until they have reached an essentially horizontal position as indicated in FIG. 3. When the springs have reached this horizontal position, (due to the weight of the bale upon the springs) lugs 68 will protrude through the spaces thereby positively engaging and urging the roll of material rearwardly off of the roll forming machine. Once the bale clears the machine the springs immediately return to their initial position, shown in FIG. 1.

Figure 6:
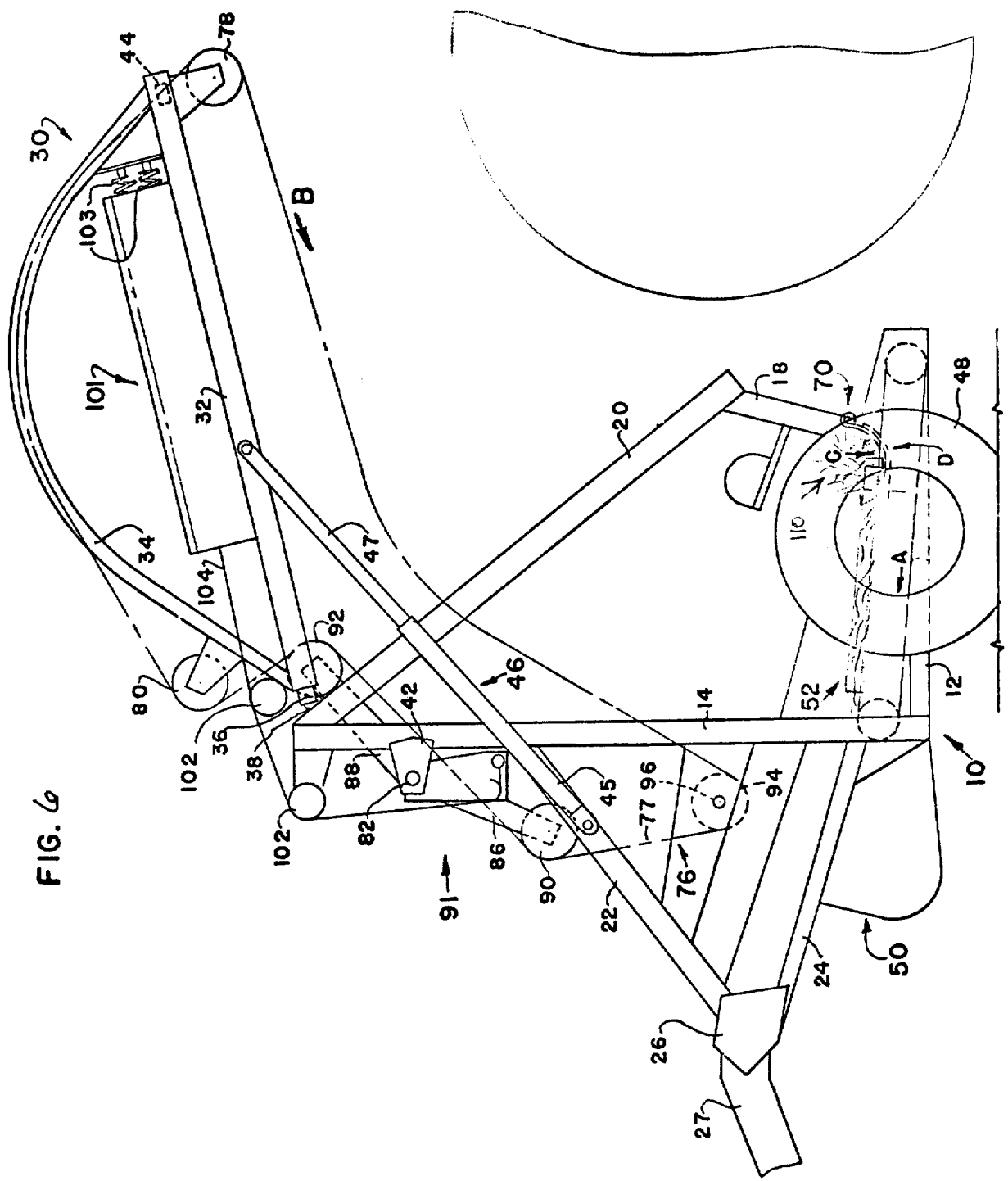
FIG. 6 is a side elevation of the crop material roll forming machine after it has discharged a formed roll and has begun forming another core of material.

As shown in FIG. 6, once the springs have returned to their initial position and prior to the lowering of the upper frame the roll forming machine can resume delivery of the crop material to the floor of the machine since the springs will direct the incoming crop material back onto the flexible chain conveyor thereby initiating core 110 of the roll. This type of operation creates a semi-continuous roll forming operation which substantially decreases the length of time of the harvesting operation.

Having thus described the invention, what is claimed is:

1. Method for forming a roll of crop material in a roll forming machine having a floor and upper apron assembly between which the roll is formed, said method comprising:
   a. delivering a swath of crop material from a field to the floor of the roll forming machine,
   b. moving the material longitudinally across the floor,
   c. directing said material away from said floor and into contact with the upper apron under conditions where the apron is positioned in a lowered bale forming position,
   d. rotating said material between said upper apron and said floor,
   e. discontinuing delivery of said swath of crop material,
   f. raising said upper apron from contact with the roll of material and into a raised bale discharging position,
   g. conveying said roll from said floor,
   h. delivering a swath of crop material from the field to said floor and then directing said material away from a discharge end of said floor to thereby initiate the formation of another roll of material prior to the lowering of said upper apron to its bale forming position, and
   i. lowering said upper apron to its bale forming position.

2. Method for forming a roll of crop material in a roll forming machine having a floor and an upper apron assembly between which the roll is formed, said method comprising:
   a. delivering a swath of crop material from a field to the floor of the roll forming machine,
   b. moving the material longitudinally across the floor,
   c. directing said material away from an end of said floor and into contact with the upper apron under conditions where the apron is positioned in its lowered bale forming position,
   d. rotating said material between said upper apron and said floor,
   e. compressing said material during rotation between said upper apron and said floor,
   f. discontinuing delivery of said material to said floor of said machine,
   g. raising said upper apron from contact with the roll of material and into a bale discharging position,
   h. conveying said roll from said floor,
   i. delivering a swath of crop material from the field to said floor and then directing said material away from a discharge end of said floor to thereby initiate the formation of another roll of material prior to the lowering of said upper apron to its bale forming position, and
   j. lowering said upper apron to its bale forming position.

* * * * *